US006432189B1

(12) United States Patent
Curts et al.

(10) Patent No.: US 6,432,189 B1
(45) Date of Patent: Aug. 13, 2002

(54) ANTISTATIC COMPOSITION AND METHOD OF USING SAME

(75) Inventors: Lawrence Edmond Curts, Richmond; Earl Clinton McDermid, Rockwood; Henry Joseph Sapanio, Morriston, all of (CA)

(73) Assignees: Petro-Canada; E. C. McDermid Holding Limited, both of Mississauga (CA)

( * ) Notice: Subject to any disclaimer, the term of this patent is extended or adjusted under 35 U.S.C. 154(b) by 0 days.

(21) Appl. No.: 09/512,043

(22) Filed: Feb. 24, 2000

(51) Int. Cl.[7] .......................... C09D 4/00; D06M 11/00; B05D 3/02

(52) U.S. Cl. ............ 106/285; 106/287.14; 106/287.25; 252/8.61; 427/285; 427/393.1

(58) Field of Search ................................ 427/284, 285, 427/393.1, 392, 391; 106/285, 287.14, 287.16, 287.25; 252/8.61, 8.62, 8.63, 8.81

(56) References Cited

U.S. PATENT DOCUMENTS 5,460,865 A * 10/1995 O'Lenick, Jr. .............. 427/421

* cited by examiner

*Primary Examiner*—Brian K. Talbot
(74) *Attorney, Agent, or Firm*—Philip Mendes da Costa; Bereskin & Parr

(57) ABSTRACT

An antistatic composition for treating a substrate such as paper for use in a photocopier or the like, in rolls, or bundles in which sheets of the substrate are individually fed from a bundle of sheets of the substrate, comprises a single phase hydrocarbon oil composition. The hydrocarbon oil may optionally include additional antistatic additives. The composition reduces static between the individual sheets in the bundle, thus reducing paper misfeeds and jams when individual sheets in the bundle are fed into the photocopier. Also disclosed is a method of treating a substrate for use in a photocopier in which sheets of the substrate are individually fed from a bundle of sheets of the substrate, or rolls of a substrate, with an antistatic composition to reduce static between the individual sheets of the substrate. The method includes applying an antistatic composition including a hydrocarbon oil to at least one lateral margin of the bundle of sheets of the substrate.

12 Claims, 1 Drawing Sheet

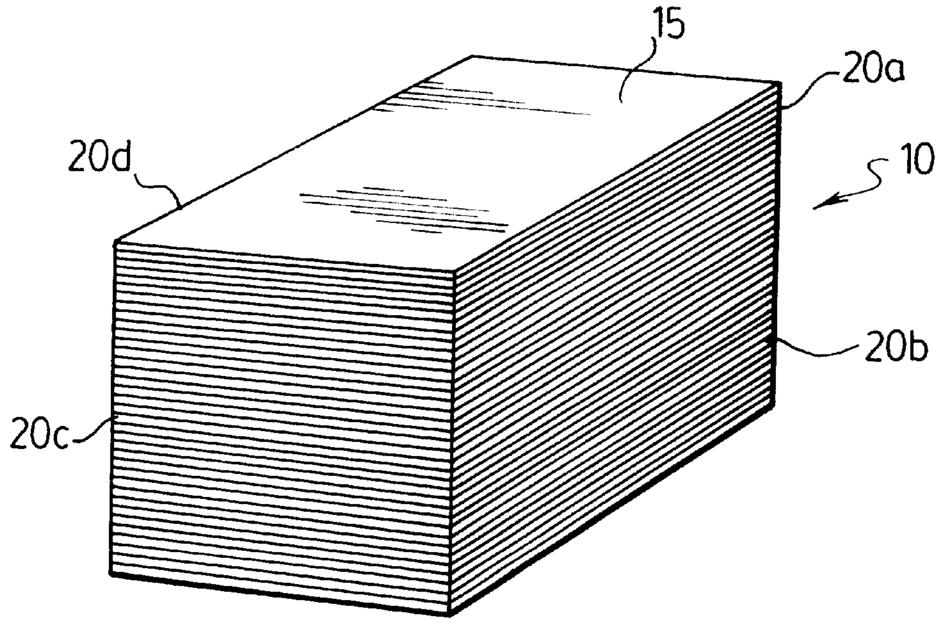
FIG.1.
FIG.2.
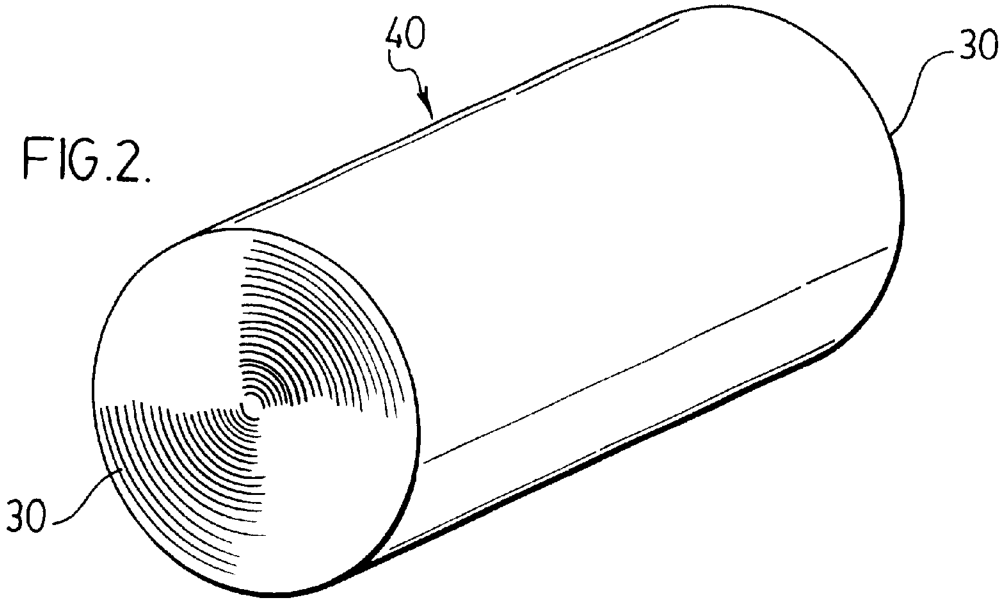

ANTISTATIC COMPOSITION AND METHOD OF USING SAME

FIELD OF THE INVENTION

The present invention relates to an antistatic composition. More particularly, it relates to an antistatic composition for treating paper and other products to be used in photocopy machines and the like. The antistatic composition may also be used in the pre-processing of jumbo, mill, or parent rolls of paper, prior to printing, sheeting, or roll to roll converting. The invention also relates to a method of using the antistatic composition.

BACKGROUND TO THE INVENTION

Antistatic compositions have been used in various industries. It is known to apply antistatic compositions to paper products for use in photocopy machines, but not with respect to industrial converting processes (ie. application to jumbo, mill or parent rolls of paper prior to processing). However, each of the known compositions and methods of application have drawbacks. The present invention is an improvement over those compositions and methods known in the art.

For example, U.S. Pat. No. 3,615,403 to Cheung teaches a water based electroconductive coating to be applied to the entire surface of paper for use in photocopy machines. The coating includes an N-vinylpyrrolidone polymer, polyvinyl acetate emulsion and an inorganic salt-polyhydric alcohol system. The patent teaches that the application of the composition to paper used in photocopy machines results in improved copy quality.

U.S. Pat. No. 4,370,412 to Cruickshank discloses a water soluble electroconductive material to be applied to paper for use in photocopy machines. The material includes a sulfonated polystyrene and a salt of sulphuric acid and its derivatives. The cation of the salt is selected from ammonium, alkali metals and amines. Application of the electroconductive material improves the retention of ink on the paper, resulting in a better reproduction.

U.S. Pat. Nos. 5,879,748 (to Conti et al) and 5,460,856 (to O'Lenick, Jr.) relate to off-set lithographic printing processes. Each discloses the application of an oil based emulsion to the entire surface of a printed paper substrate.

Conti et al. uses a non-silicone oil aqueous lubricant emulsion including a hydrocarbon oil, a low hydrophillic—lipophilic balanced surfactant, a high hydrophillic—lipophilic balanced surfactant and water. The composition is uniformly applied to the cured heat set printed web. The hydrocarbon oil functions as a lubricant to protect the printed surface.

O'Lenick, Jr. teaches a composition including a mineral oil, dimethylpolysiloxane, a non-ionic emulsification agent and water. The composition is applied to wet ink prior to the curing or heat treatment steps. The mineral oil acts as a lubricant/anti-smudge agent. The dimethylpolysiloxane is an antistatic agent.

The teachings in each of these references has drawbacks, in that the electroconductive compositions are complicated (eg oil in water emulsions). The compositions are not used to reduce static build up between the individual sheets of paper in a bundle, but rather are to improve the quality of the resulting copy. The compositions are applied to the entire surface of the paper, resulting in excess usage for reduction of static build up. The Conti et al. and O'Lenick references are not for ordinary plain paper for use in photocopy machines, but instead are for lithographic processes.

SUMMARY OF THE INVENTION

In one aspect of the present invention, there is provided an antistatic composition comprising a hydrocarbon oil for use in treating a substrate for use in processes or machines in which sheets of the substrate are individually fed from a bundle of sheets of the substrate. In a related aspect, the antistatic composition may be used as a treatment in the industrial pre-processing of jumbo, mill, or parent rolls of substrate of any size or grade prior to printing, sheeting, or roll to roll converting.

In another aspect of the invention, there is provided a method of treating a substrate for use in processes or machines in which sheets of the substrate are individually fed from a bundle of sheets of the substrate with an antistatic composition to reduce static between the individual sheets of the substrate, the method comprising applying an antistatic composition including a hydrocarbon oil to at least one lateral margin of the bundle of sheets of the substrate. In a related aspect, the method comprises applying the antistatic composition to at least one end wall of a jumbo, mill or parent roll of substrate prior to printing, sheeting or roll to roll conversion.

The antistatic composition is preferably a single phase composition consisting of or at least essentially consisting of a hydrocarbon oil. The antistatic composition may comprise of up to 100% wt % hydrocarbon oil, and may optionally include one or more additional functional additives. In one particularly preferred aspect, antistatic additives such as a polymeric sulphuric compound, a polyamino polyol, and other known antistatic additives are present in an amount between about 0.001% and 0.10 wt % of the antistatic composition. The composition may optionally include one or more other additives such as antioxidants, stabilizers, corrosion inhibitors, and defoaming agents.

In one preferred aspect, the antistatic composition may be applied to one or more of the edges of the substrate in an amount between about 10 grams and about 50 grams per kilogram of substrate.

The present invention provides a cost effective, hydrocarbon oil based antistatic composition which reduces static in bundles or rolls of substrate to be processed either in an automated or manual fashion. It reduces the occurrence of misfeeds and jams in photocopiers and the like.

BRIEF DESCRIPTION OF THE DRAWINGS

These and other advantages of the present invention will be more fully and completely understood through a consideration of the following description taken together with the accompanying drawings in which:

FIG. 1 is a perspective view of a bundle of substrate showing the areas to which the antistatic composition of the present invention may be applied; and FIG. 2 is a perspective view of a roll of substrate to which the antistatic composition of the present invention may be applied.

DETAILED DESCRIPTION OF THE PREFERRED EMBODIMENT

The present inventors have surprisingly found that a hydrocarbon based oil may be used to treat a substrate such as ordinary plain paper stock to reduce static between the sheets of paper in a bundle. This significantly reduces paper misfeeds and paper jams when the paper is fed through an automated paper feeding machine such as a photocopier, facsimile machine, or any other process where a bundle of sheets of paper are individually processed (eg printing processes which use sheet fed paper rather than a web feed process). The antistatic composition of the present invention may also be applied to jumbo, mill or parent rolls of substrate, prior to printing, sheeting, or roll to roll converting. While reference herein is made to paper, it will be appreciated that the invention is applicable to any other sheets or rolls of a substrate to be used in photocopiers or the like.

The antistatic composition of the present invention may be formed primarily from one or more hydrocarbon oils. Examples of such oils include isodewaxed basestock (solvent refined and hydrotreated), paraffinic oils, isoparaffinic oils, naphthenic oils, aromatic oils, synthetic oils such as polyalphaolefins and esters. Preferably, the composition includes one or more oils selected from above list which have a range of 3 cst to 100 cst at 40° C. Most preferably, the composition is formed primarily from technical and pharmaceutical white oils such as isodewaxed, paraffinic, and isoparaffinic base oils.

The oil composition is preferably a single phase, and may comprise between 50% and 100% by weight hydrocarbon oil, preferably between 90% and 100% by weight hydrocarbon oil.

Although the hydrocarbon oil may be used by itself as an antistatic composition, the antistatic properties of the oil may be further enhanced by the addition of antistatic additives. Such antistatic additives include one or more compounds which increase the conductivity of the substrate to which they are applied. Examples of antistatic additives which may be added to the base hydrocarbon oil include polysiloxanes, sulphur and amino compounds, for example polyamino polyols and polymeric sulphuric compounds. Other examples of additives include silicon based compounds such as methylpolysiloxane and methacrylate based compounds which also acts as a defoaming agent. Preferably, the antistatic agent includes at least one polyamino polyol.

Typically, only a small amount of antistatic additives are required to enhance the antistatic properties of the hydrocarbon oil. Preferably, the antistatic additives may comprise between about 0.001 wt % and about 0.10 wt % of the total composition. Most preferably, the antistatic additives comprise between about 0.001 wt % and 0.03 wt % of the total composition.

The antistatic composition may include other additives such as corrosion inhibitors, defoaming agents, stabilizers and antioxidants. These other additives are typically present in very small amounts (eg. less than 0.50 wt %) of individual additives. Examples of corrosion inhibitors are polybutenyl succinimide and an alkyl succinic acid, and oleosarcosine. Examples of stabilizers and antioxidants are natural vitamin E and mixed tocopherol concentrate, phenolic amino and phosphite stabilisers. Examples of defoaming additives include dimethyl polysiloxane, methacrylate and silicone based defoamers. Preferably, the antistatic composition includes a defoaming agent based on methylpolysiloxane, and polybutyl succinimide as a corrosion inhibitor.

The antistatic compositions of the present invention may be applied to paper designed for use in processes and machines where individual sheets of the paper are fed from a bundle, or where bulk paper is fed from rolls. The composition may also be applied to any other product such as bundles of polyvinyl acetate, or for example two ply carbonless paper which are designed for similar use.

Referring to FIG. 1, there is shown a bundle of paper 10 to which the antistatic composition of the present invention may be applied. The antistatic composition may be added to the paper at various stages of production. For example, the antistatic composition may be added directly into the beater mix as a part of the pulp and paper chemical blend. In this fashion, the antistatic composition is impregnated directly into the paper during its formation.

Alternately, the antistatic composition may be applied to the paper after it has been formed but before it is rolled. Thus, for example, the antistatic composition may be applied to the entire surface 15 of the paper while the dry paper is being transferred to the station where it is rolled. Such an application is useful for processes in which paper is used in web form rather than in bundle form.

In another method, the antistatic composition is applied to the web after it is formed and dry. It is preferred to also apply the antistatic composition to the substrate when stacked in a bundle (i.e. after the web has been cut into appropriate sized sheets and produce the bundle). In this case, the antistatic composition may be applied to one or more of the lateral margins 20*a*, 20*b*, 20*c* and 20*d* of the paper bundle 10. Because the antistatic composition of the present invention may be effectively applied only to the lateral margins 20, it will be appreciated that a significantly less amount of the antistatic composition is required than if the entire surface 15 is treated. For example, if the bundle of paper 10 has four sides, the antistatic composition may be applied to one, two, three or all four sides 20*a*, 20*b*, 20*c* and 20*d* respectively. As shown in FIG. 2, the antistatic composition may be alternately applied to the end walls 30 of a roll of paper 40. If the roll 40 is to be subjected to further processing in which it will be cut, it is desirable to apply the antistatic composition to both end walls 30 of the roll.

If the antistatic composition of the present invention is applied to the entire surface 15 of the paper, it may be applied in an amount between about 5 grams and 100 grams per kilogram of paper. More preferably, the antistatic composition is applied in an amount between about 30 grams and 50 grams per kilogram.

If the composition is applied only to the lateral margins 20 of the bundle of paper, it may be applied in an amount between about 10 grams and 50 grams of oil per kilogram of paper. More preferably, the antistatic composition is applied to the lateral margins 20 in an amount between about 20 grams and about 30 grams of oil per kilogram of paper. In this case, the most preferable method to apply the antistatic composition is by spraying the exterior of the bundle 10, while the bundle is contained within a pressurized area. For rolls of paper, the end walls 30 may similarly be sprayed. In this manner the antistatic composition is absorbed into the paper, leaving little to no residue on the surface of the paper. Thus, the end product is not greasy. Preferably, the antistatic composition is applied to each of the lateral margins of a bundle, so that the user need not worry about how to orient the bundle of paper in a photocopier or other processing equipment.

It will be appreciated that various changes and modifications may be made within the spirit of the invention, and all such changes are included within the scope of the attached claims.

What is claimed is:

1. An antistatic composition to treat a substrate for use in processes or machines, in which sheets of the substrate are individually fed from a bundle of sheets of the substrate, or rolls of substrate, the composition consisting essentially of a hydrocarbon oil, said composition being a single phase.

2. The antistatic composition as claimed in claim 1 comprising at least one hydrocarbon oil selected from the group consisting of isodewaxed basestock, paraffinic oils, isoparaffinic oils, naphthenic oils, aromatic oils, and polyalphaolefins and esters.

3. The antistatic composition as claimed in claim 1 wherein said hydrocarbon oil consists essentially of isodewaxed basestock.

4. The antistatic additive as claimed in claim 1 additionally comprising at least one additive selected from the group of additives consisting of defoaming agents, stabilizers, antioxidants and corrosion inhibitors.

5. A method of treating a substrate, for use in processes or machines in which sheets of the substrate are individually fed from a bundle of sheets of the substrate, or a roll of substrate, with an antistatic composition, the method of comprising applying a single phase antistatic composition including a hydrocarbon oil to at least one lateral margin of the roll or bundle of sheets of the substrate prior to processing the substrate to produce an image.

6. The method as claimed in claim 5 wherein the hydrocarbon oil comprises at least 50 wt % of the antistatic composition.

7. The method as claimed in claim 6 wherein the hydrocarbon oil comprises at least 90 wt % of the antistatic composition.

8. The method as claimed in claim 6 wherein the hydrocarbon oil comprises at least 99.5 wt % of the antistatic composition.

9. The method as claimed in claim 5 wherein the antistatic composition additionally comprises at least one antistatic additive.

10. The method as claimed in claim 9 wherein the at least one antistatic additive is selected from the group consisting of a polymeric alkyl sulphuric compound, a polyamino polyol, polysiloxanes and methylpolysiloxanes.

11. The method as claimed in claim 10 wherein the at least one antistatic additive is a polymeric sulphuric compound and a polyamino polyol.

12. The method as claimed in claim 5 wherein the antistatic composition is applied to the lateral margins of the bundle of sheets of the substrate in an amount between about 10 grams and about 50 grams per kilogram of substrate.

* * * * *